United States Patent [19]

Cooke et al.

[11] Patent Number: 4,967,082

[45] Date of Patent: Oct. 30, 1990

[54] TEMPERATURE COMPENSATED THERMAL RADIATION DETECTORS

[75] Inventors: Martin E. Cooke, Salisbury, United Kingdom; Andrew A. Turnbull, Reigate, England

[73] Assignee: U.S. Philips Corp., New York, N.Y.

[21] Appl. No.: 326,580

[22] Filed: Mar. 21, 1989

[30] Foreign Application Priority Data

Apr. 22, 1988 [GB] United Kingdom ............... 8809593

[51] Int. Cl.⁵ ............................................. G01J 5/06
[52] U.S. Cl. ................................ 250/338.3; 250/332; 250/349
[58] Field of Search .................... 250/338.3, 349, 332

[56] References Cited

U.S. PATENT DOCUMENTS 4,198,564  4/1980  Baker et al. ...................... 250/338.3
4,792,682  12/1988  Endou et al. ..................... 250/338.3

OTHER PUBLICATIONS

Proceedings of SPIE, vol. 807, pp. 92-97; 1987, "High Resolution 64-Element Pyroelectric Linear Array IR Detector", Turnbull et al.

Primary Examiner—Carolyn E. Fields
Attorney, Agent, or Firm—William L. Botjer

[57] ABSTRACT

Thermal radiation detection apparatus is provided comprising an array of pyroelectric detectors 1,2,3,4 in which compensation is provided for the effect of ambient temperature changes on the detector outputs and also for d.c. offsets which occur in source follower impedance converters 13 necessarily used with each detector. Single element detectors are used, the end pair of elements 3,4 being shielded from radiation and used as reference elements. Each element has a pair of diodes 11,12 connected in parallel in opposite sense to provide a d.c. path across the element. The reference element outputs are averaged 16,17,18 and fed via a high gain negative feedback loop 19 to the common connection 10 of all the elements. Offset voltages and element signals generated by ambient temperature changes are thereby compensated to the extent that the reference offsets and thermal voltages equal those of the active detector elements.

6 Claims, 1 Drawing Sheet

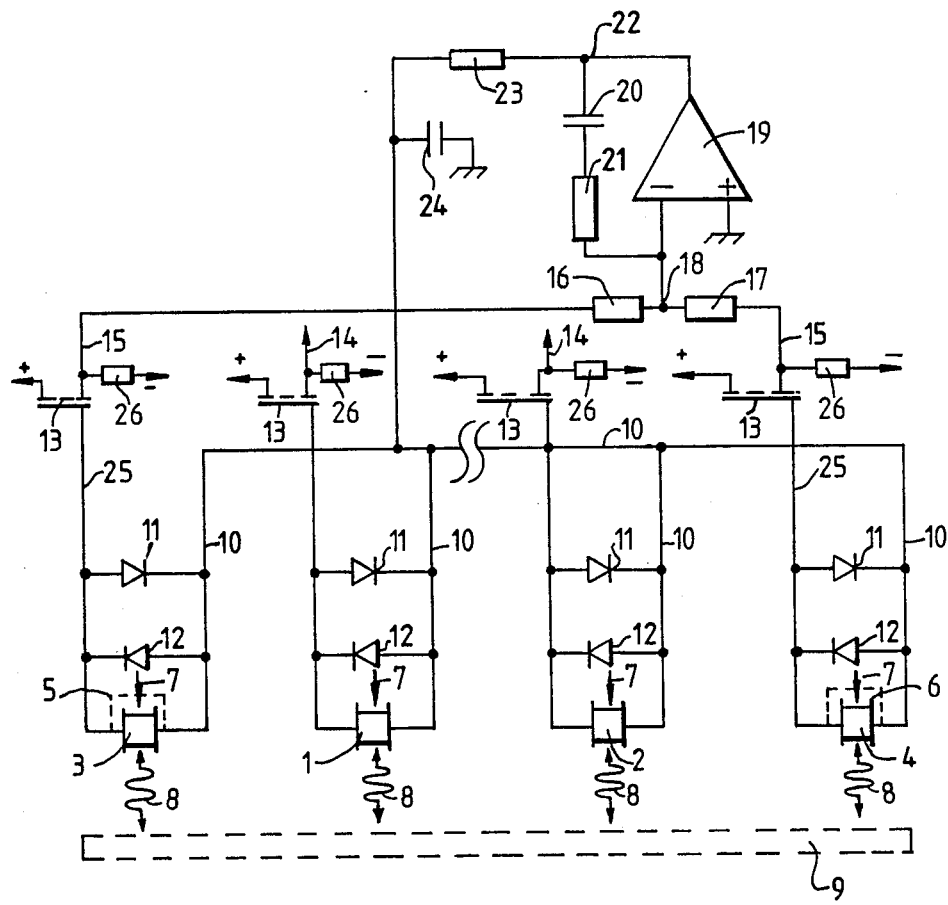

TEMPERATURE COMPENSATED THERMAL RADIATION DETECTORS

BACKGROUND OF THE INVENTION

This invention relates to thermal radiation detection apparatus comprising a first high impedance thermal radiation detector element shunted by a low leakage device, said detector element being disposed on a mount and placed to receive radiation from a scene and thereby change in temperature and produce an output signal between two terminals on the element, one terminal of the detector element being connected to an output, and a reference low leakage device, one terminal of which is connected via a high gain negative feedback loop to the other terminal of the reference low leakage device and also to the other terminal of the detector element via a common line.

Such apparatus is disclosed in an article by A. A. Turnbull and M. E. Cooke entitled "High resolution 64-element pyroelectric linear array IR detector" and presented at the Fourth International Symposium on Optical and Optoelectronic Applied Science and Engineering from 30th Mar. to 3rd Apr. 1987 at The Hague, Netherlands, and subsequently published in Proceedings of SPIE, Vol. 807, pages 92 to 97.

This article describes thermal radiation detection apparatus comprising, in sequence, a radiation chopper, a linear array of pyroelectric detector elements, an integrated circuit containing a corresponding array of impedance converting source followers for the element outputs and a multiplexer for sampling the source follower outputs to provide a single channel signal for subsequent amplification, digitisation and digital signal processing.

The operation of the high gain negative feedback loop ensures that any d.c. offset in the output voltage at the one terminal of the reference low leakage device is reduced to zero. Consequently any d.c. offset in the output voltage at the output terminal of the detector element is substantially reduced to zero. The low leakage device establishes a d.c. connection for the negative feedback loop and its leakage is low enough at zero voltage not to degrade the performance of the detector element.

The use of a low leakage device in parallel with a pyroelectric element is described in British Patent Specification No. 1,580,403. This device is preferably a pair of diodes connected in parallel in opposite sense. The device provides a d.c. return path for the offset compensation loop as well as limiting the detector element output voltage in the event of large temperature changes.

In such apparatus there are two particular problems. First, compensation of some kind has to be provided for the large signals produced by the detector elements of the array due to temperature changes of the whole assembly. External termperature changes produce either rising or falling ramps of temperature of the elements, due to their finite thermal connection with the environment, which, in turn, produce output signals. The effect can mask wanted signals. For example in a typical equipment in which F/1 infrared optics are used to collect scene radiation which is then chopped at 40 Hz, a signal of $7 \times 10^{-4}$ volts peak-to-peak per degree of black body scene temperature differences may be produced. A temperature ramp of only 0.017 degrees per second would produce signals of $5 \times 10^{-2}$ volts, two orders larger than the signal voltage for one degree in the scene. Since typically it is desirable to be able to discriminate scene temperature differences of some 0.15 degrees centrigrade, the necessity for temperature compensation is all the more essential.

It should be noted that, following a large heat input to the array, there is a delay of about one thermal time constant (typically 60 milliseconds) before the temperature ramp settles to the same rate of temperature change for all elements.

A second problem derives from the offset voltages from each source follower. Typically, each detector has a MOSFET or a JFET source follower to provide a coupling between the very high impedance of the detector and the more usual impedance levels found in electronic circuitry. The source followers are sampled in sequence by the multiplexer, typically using MOSFET switches. The multiplexed signal is then amplified and fed to an analogue to digital converter which digitises the output of each detector as it is multiplexed. The multiplexing and digitising are synchronised with the operation of the radiation chopper blade in front of the array of elements which alternately exposes the array to scene radiation and to radiation from the chopper blade. The sampling of the multiplexer takes place at the end of each exposure to allow as much time as possible for the temperature of the elements to change. By subtracting the digitised outputs from each element obtained at the end of consecutive exposures to scene and blade radiation, any offset from the source follower associated with each element is cancelled leaving only the signal associated with the difference in scene and blade radiations.

The average offset of an array of integrated MOSFET source followers may vary from one diffusion batch to another by as much as a third of a volt and on any one particular array it will change by typically 100 mV over the desired temperature range. Individual offsets along the length of any one array may however typically vary by as little as ±15 mV around the average. As explained above, in the system both these average and individual offsets are removed by later processing. But in practice, if d.c. coupling is desired, these average offsets could occupy the bulk of the available dynamic range of the following amplifier and analogue to digital converter, thus severely restricting the overall resolution of the system. It will be seen that it is very desirable, if not essential, to remove as much as possible of the offset from the output of each source follower before amplification and analogue to digital conversion are carried out.

The article by Turnbull and Cooke cited above discloses solutions to both of these problems. The first problem is solved by arranging for each element to be connected in opposition to an associated equal element which is mounted adjacent to the element but which is shielded from the scene radiation. Any temperature ramps affect the two elements equally, the opposite connection of the elements providing cancellation of the temperature ramp generated signals. The second problem is solved by providing a reference opposed paralleled diode pair at either end of the linear array in addition to the diode pairs across the detector elements, each reference diode pair having a MOSFET source follower as nearly identical to the source followers of the elements of the array as possible. The solution relies on the offsets of the reference source followers being the same as those of the active element source followers. The two reference source follower outputs are averaged and applied to the negative input of a high gain differential d.c. amplifier whose positive input is at earth potential. The amplifier output is applied to the common connection of all active elements and reference diode pairs, the negative feedback connection ensuring that the reference average outputs are brought to zero, compensating their offsets and hence also compensating the offsets of the active channels to the extent that their offsets are the same as those of the reference channels.

However, continued work by the Applicants has revealed disadvantages of the above temperature compensation solution. One disadvantage is that twice as many pyroelectric elements are required for a given number of active channels. Also, the reference diode pairs alone may not constitute a close enough d.c. replica of the active elements in parallel with their diodes over the whole of the required operational temperature range.

SUMMARY OF THE INVENTION

It is an object of the present invention to mitigate these disadvantages, and the Applicants have found that this can, surprisingly, be achieved by adopting a simpler arrangement of reference and detector elements. According to a first aspect, the invention provides thermal radiation detection apparatus as set out in the opening paragraph characterised in that the reference low leakage device is shunted by a reference radiation detector element nominally identical to the first radiation detector element and disposed on the mount adjacent the first radiation detector element, the reference element being shielded from scene radiation, whereby ambient temperature changes affect both the detector and reference elements equally and hence the reference element output caused by ambient temperature changes substantially compensates, via the feedback loop, the detector element output caused by the ambient temperature changes.

According to a second aspect the invention provides thermal radiation detection apparatus comprising a first high impedance thermal radiation detector element shunted by a low leakage device, said detector element being disposed on a mount and placed to receive radiation from a scene and thereby change in temperature and produce an output signal between two terminals on the element, one terminal of the detector element being connected to a first impedance converter and thence to an output, and a reference low leakage device, one terminal of which is connected to a second impedance converter nominally identical to the first impedance converter and thence via a high gain negative feedback loop to the other terminal of the reference low leakage device and also to the other terminal of the detector element via a detector common line so that the output of the second impedance converter is at zero potential whereby any offset in the second impedance converter is compensated and hence any offset in the first impedance converter is substantially compensated, characterised in that the reference low leakage device is shunted by a reference radiation detector element nominally identical to the first radiation detector element and disposed on the mount adjacent the first radiation detector element, but shielded from scene radiation, whereby ambient temperature changes affect both the detector and reference elements equally and hence the detector element output caused by ambient temperature changes is substantially compensated by the reference element output caused by the ambient temperature changes.

The operation of the high gain negative feedback loop is now to compensate the thermal ramp generated signals as well as to correct the source follower offsets. Also, the reference elements used in the loop are now close replicas of the detector elements.

The apparatus will usually be characterised in that the first detector element is one of an array of nominally identical detector elements, one terminal of each being connected to the detector common line and the other terminals of the detector elements being connected one each to associated impedance converters nominally identical to the first and second impedance converters. The array is typically a linear array, as in the Turnbull and Cooke article cited above, means being provided to scan a thermal image transverse to the length of the array. Alternatively a two dimensional array of rows and columns of active detector elements may be used, dummy elements being provided at the ends of the rows and/or columns.

The detector elements may consist of a pyroelectric ceramic material, such as barium titanate. But alternatively, detector elements consisting of a poled polyvinylidene fluoride copolymer film may be used, as described in unpublished British Patent Application No. 8626969 which corresponds to U.S. Pat. No. 4,806,763.

BRIEF DESCRIPTION OF THE DRAWING

An embodiment of the invention will now be described with reference to the accompanying drawing in which:

FIG. 1 shows a circuit providing simultaneous compensation of temperature ramp effects and of source follower offsets.

DETAILED DESCRIPTION OF THE PREFERRED EMBODIMENT

Referring to FIG. 1, the end members 1,2 of a linear array of 64 single element pyroelectric detectors are shown. Also shown are two reference pyroelectric detectors 3 and 4 at the same pitch as the array elements and nominally identical to the active detectors of the array but shielded 5,6 from incident radiation 7. The reference and active elements are in radiative thermal connection 8 with a substrate 9 having a thermal mass large compared with the elements and having good thermal conductivity so that it is effectively an isothermal surface. The elements are also in thermal contact with one another via the common electrical conductor 10. Thus the temperature of all elements, reference and active, are held closely equal. The substrate 9 is in thermal contact with the external enviroment via a path (not shown) having a defined thermal resistance. Changes in the enviromental temperature produce closely equal ramp rates of temperature change in both the reference and active elements, once any initial thermal transient has decayed, and hence generate closely equal signals due to these temperature changes. The construction and anti-microphonic mounting of the elements is described in the article cited hereinbefore and will not be described further. Also referred to therein is the use of an ultra-low leakage non-linear device comprising an opposed parallel-connected pair of diodes 11,12 in shunt with each element in providing a path for gate leakage currents and in shortening recovery time following signal overload.

One connection of all the elements, both reference and active, is connected to a common bias line 10, the other side of all elements being connected one each to impedance converters in the form of MOSFET source followers 13. The outputs 14 of the active elements are taken to a known multiplexing circuit. The outputs 15 of the two source followers of the reference elements are connected to either end of a series connected pair of equal resistors 16 and 17. The d.c. potential at the centre connection 18 of the pair is thus the average of the d.c. potentials of drain potentials of the two source followers 13. Connection 18 is connected to the negative input terminal of a high gain d.c. amplifier 19, the positive input terminal being earthed. Series feed-back capacitor 20 and resistor 21 form amplifier 19 into an integrator, the output on connection 22 only being steady when the connection 18 is at earth potential. A resistor 23 and capacitor 24 form a long time constant filter connecting output 22 to the common bias line 10. Thus any difference in potential between terminal 18 and earth will drive output 22, common bias line 10 and hence the gate connections 25 of the reference element source followers so that the average of the source follower outputs 15 is at earth potential. To the extent to which the source follower offset voltages between gate and source and across the element resistance of the active elements equal to those of the reference elements, the active element outputs 14 will also be at earth potential, thus largely cancelling their offsets. This is the manner of offset cancellation described in the Turnbull and Cooke article referred to above. However, in accordance with the present invention, the elements 3 and 4 are single shielded PXE detector elements and not only diode pairs. Signals generated by these elements in response to temperature ramps originating from temperature changes in the enviroment will now also be fed back to the common bias line 10 via the negative feedback loop, also largely cancelling these temperature ramp signals in the outputs 14. Thus, although the 64 detector elements are now reduced cost single element detectors rather than double element detectors, one being shielded, temperature compensation is obtained with virtually no change in the circuit save for the change of reference elements 3 and 4 to shielded PXE detector elements. The reference elements can be fabricated along with the active array elements at very little extra cost, save for the provision of shields for them.

Other benefits flow from making this change. A component of the offset voltage measured at the source follower output with respect to ground is a voltage difference across the elements due to the passage of gate leakage current in the diodes and in the elements themselves. In the circuit described in the above cited article, offset cancellation is better if the d.c. impedance of the detectors is large compared to that of the shunt connected opposed diode pair. The reference channels, being only diodes, are then more nearly equal to the active channels. But, with the invention, the reference channels have reference detector elements as well as the diode pair end are therefore closely equivalent to the active channels. Good compensation is therefore achieved regardless of the impedance ratio of the diode pairs and the elements.

Another benefit derives from the fact that the active elements do not now have a second shielded element connected in parallel with them. This increases the signal voltage obtained for a given element temperature change. But, surprisingly, is found that the noise, though increased, is not increased by the same amount. Thus the signal to noise ratio of the elements is improved.

The embodiment of the invention described above, by way of example, should not be taken as limiting the invention to a linear array of detectors with two reference elements, one at each end of the array. The invention may equally be applied if only one reference element is used or if more than two reference elements are used in association with the linear array. The invention may also be applied to a single element detector used in conjunction with a single adjacent reference element or with two reference elements, one either side of the single element, to obtain a more accurate temperature compensation signal.

From reading the present disclosure, other modifications will be apparent to persons skilled in the art. Such modifications may involve other features which are already known in the design, manufacture and use of arrays of thermal radiation detectors and of thermal imaging equipments and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

We claim:

1. Thermal radiation detection apparatus comprising a first high impedance thermal radiation detector element shunted by a low leakage device, said detector element being disposed on a mount and placed to receive radiation from a scene and thereby change in temperature and produce an output signal between two terminals on the element, one terminal of the detector element being connected to an output, and a reference low leakage device, one terminal of which is connected via a high gain negative feedback loop to the other terminal of the reference low leakage device and also to the other terminal of the detector element via a common line, characterised in that the reference low leakage device is shunted by a reference radiation detector element nominally identical to the first radiation detector element and disposed on the mount adjacent the first radiation detector element, the reference element being shielded from scene radiation, whereby ambient temperature changes affect both the detector and reference elements equally and hence the reference element output caused by ambient temperature changes substantially compensates, via the feedback loop, the detector element output caused by the ambient temperature changes.

2. Thermal radiation detection apparatus comprising a first high impedance thermal radiation detector element shunted by a low leakage device, said detector element being disposed on a mount and placed to receive radiation from a scene and thereby change in temperature and produce an output signal between two terminals on the element, one terminal of the detector element being connected to a first impedance converter and thence to an output, and a reference low leakage device, one terminal of which is connected to a second impedance converter nominally identical to the first impedance converter and thence via a high gain negative feedback loop to the other terminal of the reference low leakage device and also to the other terminal of the detector element via a detector common line so that the output of the second impedance converter is at zero potential whereby any offset in the second impedance converter is compensated and hence any offset in the first impedance converter is substantially compensated, characterised in that the reference low leakage device is shunted by a reference radiation detector element nominally identical to the first radiation detector element and disposed on the mount adjacent the first radiation detector element, but shielded from scene radiation, whereby ambient temperature changes affect both the detector and reference elements equally and hence the detector element output caused by ambient temperature changes is substantially compensated by the reference element output caused by the ambient temperature changes.

3. Apparatus as claimed in claim 1 characterised in that the first detector element is one of an array of nominally identical detector elements, one terminal of each being connected to the common line.

4. Apparatus as claimed in claim 2 characterised in that the first detector element is one of an array of nominally identical detector elements, one terminal of each being connected to the detector common line and the other terminals of the detector elements being connected one each to associated impedance converters nominally identical to the first and second impedance converters.

5. Apparatus as claimed in claim 1 characterised in that the high impedance thermal radiation detector elements are comprised of a pyroelectric ceramic material.

6. Apparatus as claimed in claim 1 characterised in that the high impedance thermal radiation detector elements are comprised of a poled polyvinylidene fluoride copolymer film.

* * * * *